CHARACTER RECOGNITION SYSTEM
Filed Feb. 9, 1953 4 Sheets-Sheet 1
FIG. 1
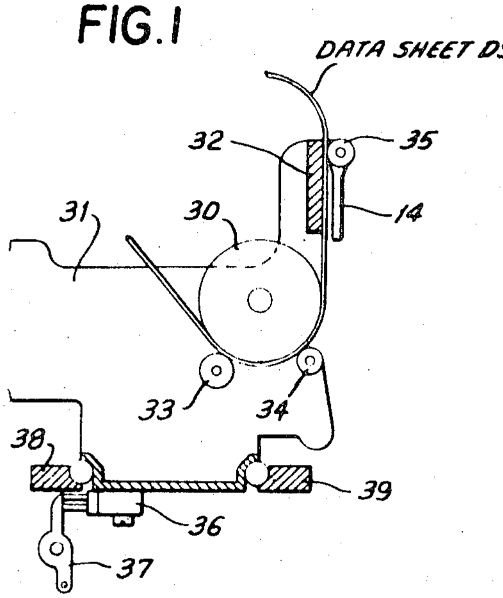
FIG. 2
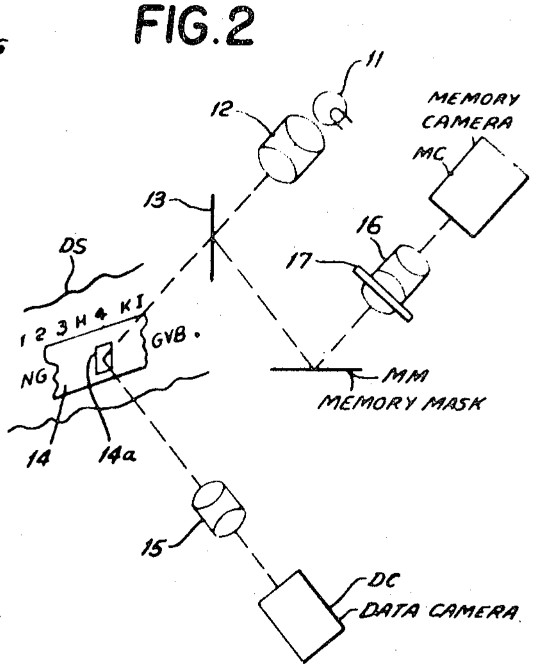
FIG. 3
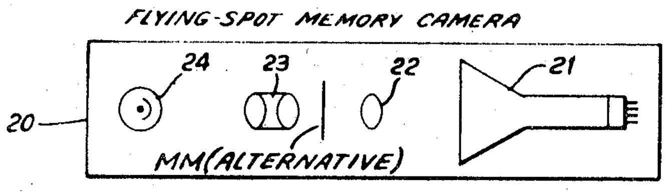
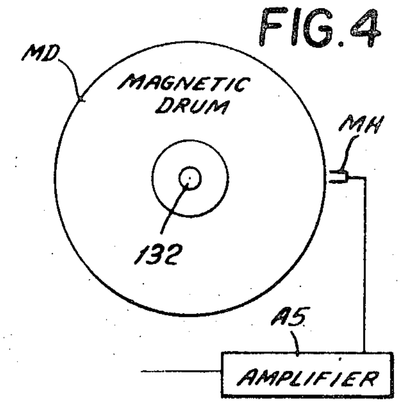
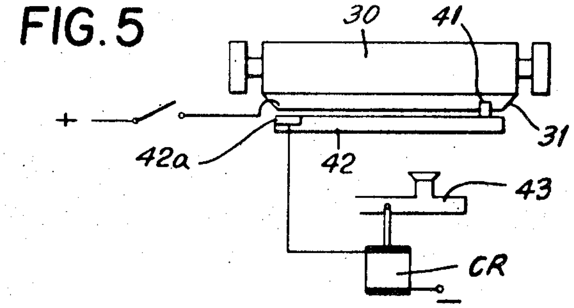
INVENTOR.
GORDON VANB. KING
BY
Joseph J Robbins
ATTORNEY Sept. 23, 1969 G. VAN B. KING 3,469,263

CHARACTER RECOGNITION SYSTEM

Filed Feb. 9, 1953 4 Sheets-Sheet 2

INVENTOR
GORDON VANB. KING
BY
Joseph J. Robbins
ATTORNEY

INVENTOR.
GORDON VAN B. KING
BY
Joseph J. Rolih
ATTORNEY

Sept. 23, 1969 G. VAN B. KING 3,469,263
CHARACTER RECOGNITION SYSTEM
Filed Feb. 9, 1953 4 Sheets-Sheet 4

INVENTOR.
GORDON VAN B. KING
BY Joseph J. Rohlen
ATTORNEY

United States Patent Office 3,469,263
Patented Sept. 23, 1969

3,469,263
CHARACTER RECOGNITION SYSTEM

Gordon van B. King, Convent, N.J., assignor to Sperry Rand Corporation, New York, N.Y., a corporation of Delaware Filed Feb. 9, 1953, Ser. No. 335,944
Int. Cl. G06k 9/12
U.S. Cl. 340—146.3 12 Claims This invention relates to data processing systems to analyze and distinctively manifest variable data, particularly graphic data such as printed or written digits, letters, or other data elements or symbols.

The general object of the invention is to provide a novel electrical system and method of analyzing, or reading and identifying, variable data; such system to be capable of analyzing graphic data and producing distinctive outputs indicative of the graphic data symbols and which may serve to control an external work device or data utilization device or devices according to the analyzed data.

The invention contemplates a novel electrical system to operate printing, accounting, calculating, or other data utilization means, under control of graphic data. According to the invention, the system will function under control of the data even when the data are conventional graphic digits, letters, or other symbols, without requiring intermediate conversion steps, such as encoding of the data on punched cards or magnetic tape, or the like.

An object of the invention resides in a data processing system featured by cathode ray or video means for reading the data and producing counterpart or picture signals of the data symbols, such signals to be utilized by data identifying means in producing distinctive outputs indicative of the data symbols. The distinctive outputs may be applied to or produced in data registering means, or in entry control means for data utilization apparatus.

An object of the invention is to provide an improved system and method of analyzing variable data by reference to indexing indicia. Unlike prior art systems, the present invention does not rely on positional relation between an item under analysis and the indexing indicia. Accordig to the invention, the interrelation between variable data and the indexing indicia will be purely by electrical effects on a receiving unit which itself will have no positional significance or relation with respect to the variable data and the indexing indicia.

The invention contemplates the analysis of variable data symbols by comparison of each data symbol with an array of index patterns respectively relating to different data symbols, the index patterns to be searched sequentially and cyclically in repetitive fashion to find the pattern relating to the data symbol being read. According to the invention, the data symbol will be read continually while its related index pattern is being sought and there will be no necessity to preserve a time relation between the reading of a data symbol and the sequence in which the index patterns are searched; the related pattern may be found at any chance step of the sequence, on the first trial of the array of patterns or on the second or on any other trial including the last trial or step of the sequence.

In another aspect of the invention, the system will analyze variable data by comparison of data signals with sequentially occurring data reference signals. More specifically, according to the invention, the data symbols will be read one at a time by a video camera which will produce a picture signal of the data symbol, and this signal will be compared with sequential reference signals respectively relating to different data symbols, in order to effect symbol identification. The reference signals, according to one embodiment in the invention, will be produced by a video camera sequentially scanning graphic index patterns. In an alternative embodiment, the reference signals will be generated as a result of magnetically reading out magnetic index patterns on a suitable magnetic record medium. The invention also embraces other alternative generating means for the reference signals. An object of the invention also resides in a novel method of constructing the index patterns for a group of data symbols.

The invention further contemplates a novel comparing circuit for comparing each data symbol signal with the reference signals to find the reference signal which has a unique relation; specifically, a unique phase relation, with the data symbol signal.

Other objects and advantages of the invention will be brought out in the following parts of the specification, including the claims, and will be apparent from the drawings.

FIG. 1 shows a representative device to handle a record bearing data to be processed.

FIG. 2 schematically shows an illustrative arrangement of video cameras and exposure means for reading the data and the index patterns.

FIG. 3 is a schematic of a flying-spot camera which may be used as alternative means for reading the reference patterns.

FIG. 4 diagrammatically represents alternative magnetic means for producing the reference signals.

FIG. 5 diagrammatically shows a simple form of carriage return control which may be applied to the record handling device shown in FIG. 1.

GENERAL DESCRIPTION

Figure 6:
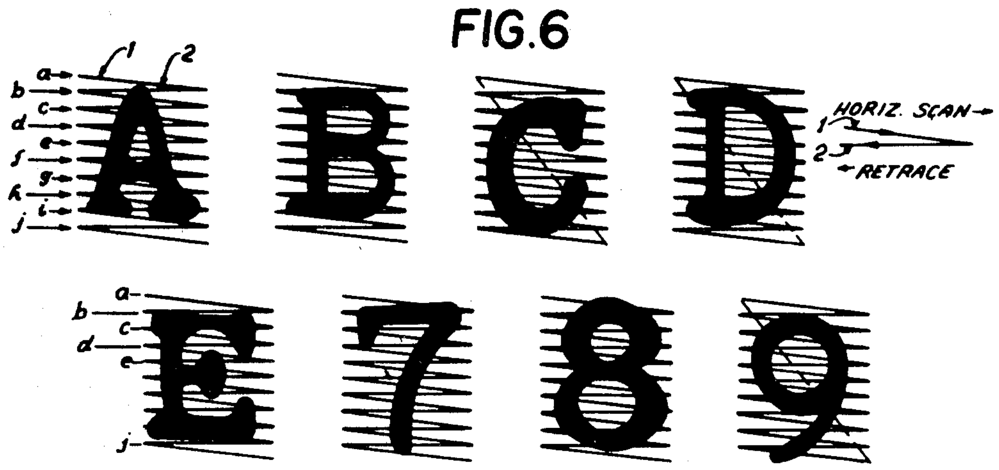
FIG. 6 shows typical data symbol images as they appear on the face of the data reading or pick-up camera tube and also shows the scanning pattern for each symbol.

Any desired data may be read, identified, and distinctly manifested in accordance with the principle of the invention. As illustrative, data composed of an alphabet of forty symbols, some of which are manifested in FIG. 6, will be considered. The alphabet of chosen symbols may include the upper case letters, the digits 0 to 9, common punctuation marks, and the space which may be conveniently denoted by a blank symbol frame. The data may be printed on successive lines of a record or data sheet, designated DS in FIGS. 1 and 2. Such record sheet may be inserted in a suitable record handling device preferably provided with automatic means for feeding the sheet to present each data symbol in turn to a reading position. The symbol at viewing position will be read by any suitable video camera, which may be referred to, for convenience, as the data camera. This camera will be supplied with the proper deflection voltages for producing the scan pattern indicated in FIG. 6. During one scanning cycle, the data camera will completely scan an image of the symbol at the reading position and will produce a time sequence of output currents constituting the picture signal of the symbol and representative of the dark and light point or areas of the symbol frame; i.e., representative of the dark areas of the symbol and of the lighter background areas not covered by the configuration of the symbol. This output of the data camera will be transmitted through a conventional amplifier to one input of a comparison circuit.

The variable data on the record sheet DS will be analyzed by comparison with an array of index patterns. In one embodiment of the invention, the index patterns may be conveniently formed on a pattern plate MM, also called a memory mask, portions of which appear in FIG. 7. Each index pattern has a matching value relationship with a different one of the symbols in the chosen alphabet. For the illustrative chosen alphabet of forty symbols, there will be forty index patterns, one for each symbol. The index patterns are preferably disposed in columns, one pattern to a column. The configuration of the patterns will be made dependent on the configurations of the corresponding symbols in the chosen alphabet. Different masks with appropriate index patterns will be used depending on the chosen alphabet and the type form of the symbols.

The index patterns on the memory mask MM will be read one after another by a suitable video camera which, for convenience, may be referred to as the memory camera. Deflecting voltages will be supplied to the memory camera to produce the scanning path indicated in FIG. 7. During a scanning cycle, one index pattern will be completely scanned and a time sequence of output currents will be produced by the memory camera. The output currents of the memory camera constituite the picture signal of the index pattern and are representative of its dark and light areas. The picture signal will be transmitted via a conventional amplifier to the other input of the comparing circuit. In successive scanning cycles, the memory camera will scan successive pattern columns. When the last column, the fortieth in the illustrative embodiment, has been scanned, the scanning beam will be deflected back to the first column, and the scanning sequence of the columns will be repeated.

The deflection voltages for the data and memory cameras are so related in frequency and synchronization that during a common scanning cycle, the data camera will make a complete scan of the data symbol at reading position while the memory camera is making a complete scan of an index pattern. During the next cycle, the data camera will repeat its scan of the symbol at reading position while the memory camera proceeds to scan the next index pattern. The outputs of both cameras will be compared during each cycle. At least one of the index patterns matches the symbol at the reading position. Therefore, during some one cycle, the cameras will produce corresponding or matching sequences of output currents. The comparing unit will react to the correspondence of output currents from the two cameras during a cycle and will produce a signal indicative of the symbol at the reading position.

The signal from the comparing unit will apply the scanned symbol to an entry control unit for a data utilization device. When the utilization device has received entry of the symbol, the data sheet will be advanced to bring the next symbol to reading position. Meanwhile, the memory camera will be continuing sequential scan of the index patterns and any one of these patterns may chance to be under scan when the scan of the next symbol begins.

The data and memory cameras can be of any desired video type, such as the iconoscope, image orthicon, flying-spot camera, and the like. The data sheet will be read by reflected light. The memory mask MM can be read by reflected light or by transillumination. The mask will preferably be of opaque material if read by reflected light, with the pattern columns having alternate dark and light areas. When the mask is to be read by transillumination, it will preferably be a slide or photographic film with pattern columns made up of alternate opaque and transparent or translucent areas.

FIG. 2 schematically shows an exemplary arrangement using a fixed common light source and optical system for illuminating both the data sheet DS and the pattern or memory mask MM and using cameras of the image scanning type for reading the data symbols and the index patterns. The common light source is designated by 11. Light from the source is projected by a lens 12 upon a partially transparent mirror 13 which passes a pencil of light to the symbol area at the reading position. If desired, a shield 14 with an aperture **14*a* framing the symbol area at reading position may be provided in front of the data sheet. The illuminated symbol has its image focused on the data camera DC by a lens 15. Mask MM is illuminated by light reflected from mirror 13. An image of all the columns of the mask is focused on the memory camera MC by a lens 16, preferably associated with a light value control or adjustable iris 17.**

In the FIG. 2 arrangement, variations in intensity of the common light source or of room illumination have equal effects on the two cameras. The mask may be made of paper with printed dark pattern areas having closely similar optical contrast with the light areas to the optical contrast between the dark and light areas of the variable data. Also, the light values to the two cameras may be balanced by adjustment of the iris 17. All of these factors facilitate the production of equal "light" and "dark" signals by the cameras when scanning light and dark areas of the data sheet and memory mask, thus making for more reliable operation of the system as a whole.

It is evident that completely separate exposure systems may be provided for exposing the data sheet and the memory mask to the cameras, instead of using a common light source and common optical means as in FIG. 2. An outstanding advantage of the use of separate exposure systems is that the two camears may be placed in unrelated locations. Also, instead of using data and memory cameras of the image scanning type, other cameras such as the flying-spot type can be used. FIG. 3 diagrammatically shows a flying-spot camera for reading a memory mask. The camera and mask are in a light-tight housing 20. The camera includes a cathode ray tube 21, a lens 22 to focus the flying-spot from the screen of the tube 21 upon the alternative memory mask MM, a condenser lens 23, and a phototube 24 upon which the condenser lens focuses light passing through the transparent or translucent areas of the mask. As the flying spot traces its path, the phototube produces a sequence of currents representative of the dark (opaque) and light (transparent or translucent) areas of the index pattern columns of the memory mask. An advantage of the flying-spot camera for reading the memory mask is that it furnishes a visible scanning light spot which can easily be aligned with the index pattern columns.

A monoscope also can be employed as the memory camera. The target plate of the monoscope may be processed with the required index patterns.

Alternative means may be used to generate the reference signals which are to serve for identification of different data symbols. One alternative device is diagrammatically illustrated in FIG. 4 and includes a magnetic drum MD fixed on a shaft 132. The magnetically coercive periphery of the drum bears a circumferential series of magnetic index patterns respectively relating to different data symbols. A magnetic head MH, which is preferably of the recording-playback type, reads the index patterns sequentially during rotation of the drum, each pattern being read within one symbol frame or scanning cycle in synchronism with the scanning of a data symbol by the data camera. As the magnetic head reacts to an index pattern, it activates an amplifier A5, of a conventional kind, to produce reference signals for application to the comparing unit.

THE RECORD HANDLING DEVICE

Any suitable record handling device for the data sheet DS can be employed. FIG. 1 shows, as an example, part of a record handling device having a form of typewriter construction. The feed roller 30 and carriage 31 mounting the roller correspond to the platen and carriage of a typewriter. The data sheet DS is inserted around the roller 30 and led upwardly into position against a vertical backing plate 32 provided on the carriage. The previously mentioned shield 14 is dependently hinged to the backing plate 32 as indicated in FIG. 1. Pressure rolls 33, 34 and 35 hold the data sheet firmly against the roller 30 and the backing plate. Mounted to the carriage 31 is a common escapement rack 36 engaged by a pawl 37. Operation of the pawl to allow column spacing travel of the carriage along the fixed ways 38 and 39 will be effected in the usual manner by conventional means which may include an ordinary space bar. Preferably, the space bar mechanism will be manually as well as automatically operable. Automatic operation of the space bar mechanism will occur upon energization of a solenoid SP (FIG. 9) the plunger of which will be linked to an element of the space bar mechanism as in an automatically operable typewriter.

The record handling device will be provided with a known line spacing and carriage return mechanism with provision for manual as well as automatic operation. FIGS. 1 and 5 diagrammatically indicate the elements of a simple carriage return control. The adjustable right-hand margin stop is designated by 41. A conductive part of the stop 41 engages a conductive strip 42*a* set in a fixed rail 42 when the carriage reaches a selected right-hand margin position. The circuit of a solenoid CR is thereby established and the solenoid operates line spacing-carriage return initiating means indicated by 43.

THE SYMBOL SCAN PATTERN

FIG. 6 shows images of several letters and numbers printed by type of pica style. The fine lines 1 and 2 crossing the images represent the trace and retrace paths of the scanning beam in the data camera DC (also see FIG. 2). The assumed directions of the trace and retrace motions are indicated at the right in FIG. 6. Throughout a complete scan of a symbol area, the vertical deflection voltage is changing at a uniform rate. The scan starts at point *a*, the scanning beam makes a trace and retrace to point *b*, and so forth down through the forward trace starting at point *j*, whereupon the vertical deflection voltage makes a rapid reversal and returns the beam to point *a*. This scanning pattern is repeated continuously as long as the data camera is functioning.

Examination of the symbols against the scanning pattern indicates the time sequence of light and dark impressions received by the data camera as scanning progresses. The corresponding signals produced in the output of the camera may be referred to as "light" and "dark" signals. One complete scan, consisting of a number of horizontal motions of the electron beam; say, ten horizontal trace and ten retrace motions as in FIG. 6, and further consisting of one vertical motion may be referred to as one symbol frame and as taking place in a scanning cycle.

SCANNING PROCEDURE FOR THE MEMORY MASK

Figure 7:
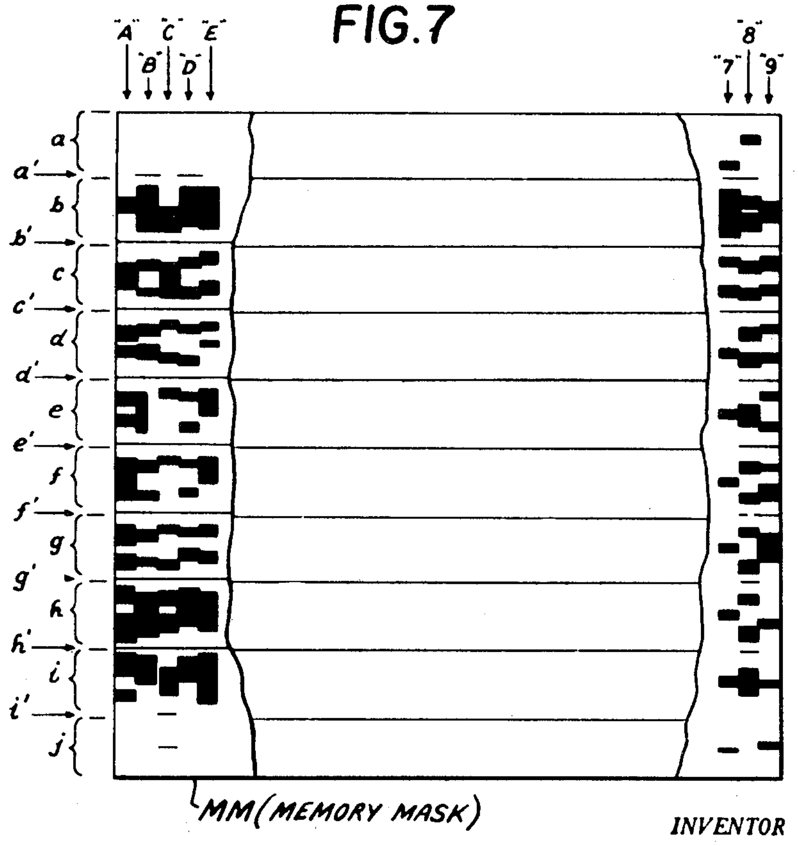
FIG. 7 is a broken view of the pattern plate or memory mask bearing the index patterns and also shows the scanning sequence for these patterns.

FIG. 7 shows portions of a memory mask designed for the chosen illustrative alphabet of forty symbols of type style indicated in FIG. 6. The memory mask has forty columns, each containing the index pattern relating to a different one of the symbols. The first column, marked "A" relates to the symbol A, the second column marked "B" relates to symbol B, and so forth. During a symbol frame, one mask column will be scanned concurrently with the scanning of a symbol. For this purpose, a common vertical scanning generator will supply the vertical deflection voltages for the data and the memory cameras. The scanning beam in the memory camera will travel vertically down a mask column in synchronism with the vertical component of motion of the scanning beam in the data camera. The horizontal deflection voltage for the memory camera will remain constant throughout a symbol frame and will change in forty discrete steps between symbol frames so as to shift the scanning beam in the memory camera to each mask column in turn. When the last column has been scanned, the scanning beam will be deflected back to the first column, and the scanning sequence will repeat. This procedure will be continuous as long as the memory camera is functioning.

During a scanning cycle, the bracketed portion *a* of a mask column will be scanned by the memory camera while the data camera is simultaneously producing the horizontal trace starting at the point *a*; unbracketed portion *a'* will be scanned while the data camera is performing the retrace to point *b* of the symbol; the bracketed portion *b* of the mask column will be scanned at the same time the data camera is performing the symbol trace starting at point *b*, and so on.

The alternate light and dark areas along a mask column, in the disclosed embodiment, are so placed and sized that when scanned by the memory camera, they produce the same time sequence or combination of "light" and "dark" signals as that resulting from the scanning of only one of the symbols of the chosen group by the data camera. For example, scanning of column "A" produces the same signal combination as scanning of symbol A only, scanning of the column "B" produces the same signal combination as results from the scanning of symbol B, and so on.

It is understood that instead of making a mask column with light and dark areas arranged in matching signal producing arrangement with the light and dark areas of the related symbol, the column areas may be arranged in a complementary relation. The scanning of such column will produce a signal combination of "mark" and "space" elements complementary to the signal combination resulting from the scanning of the related symbol. Either the symbol signal combination or the column signal combination could be reversed in phase before or after entering the comparison circuit, or the comparison circuit could be devised to equate the complementary signals. As another alternative, the mask column could be provided with a combination of light and dark points or lines to be compared with a combination of points contained within the configuration of a symbol, in accordance with a suitable combinational code.

In the broad sense that each index pattern on the mask has a unique relation to, or serves for identification of, some one symbol within the chosen group, the index pattern may be said to correspond to the symbol.

THE DEFLECTING VOLTAGE CONTROLS

Three distinct deflecting voltages are required; one to produce the horizontal scanning motion in the data camera; another to produce the vertical motions in the data and memory cameras; and a third to cause the scanning spot in the memory camera to travel horizontally in 40 discrete steps. All three must be accurately synchronized with one another and with other functions of the data processing system.

Figure 8:
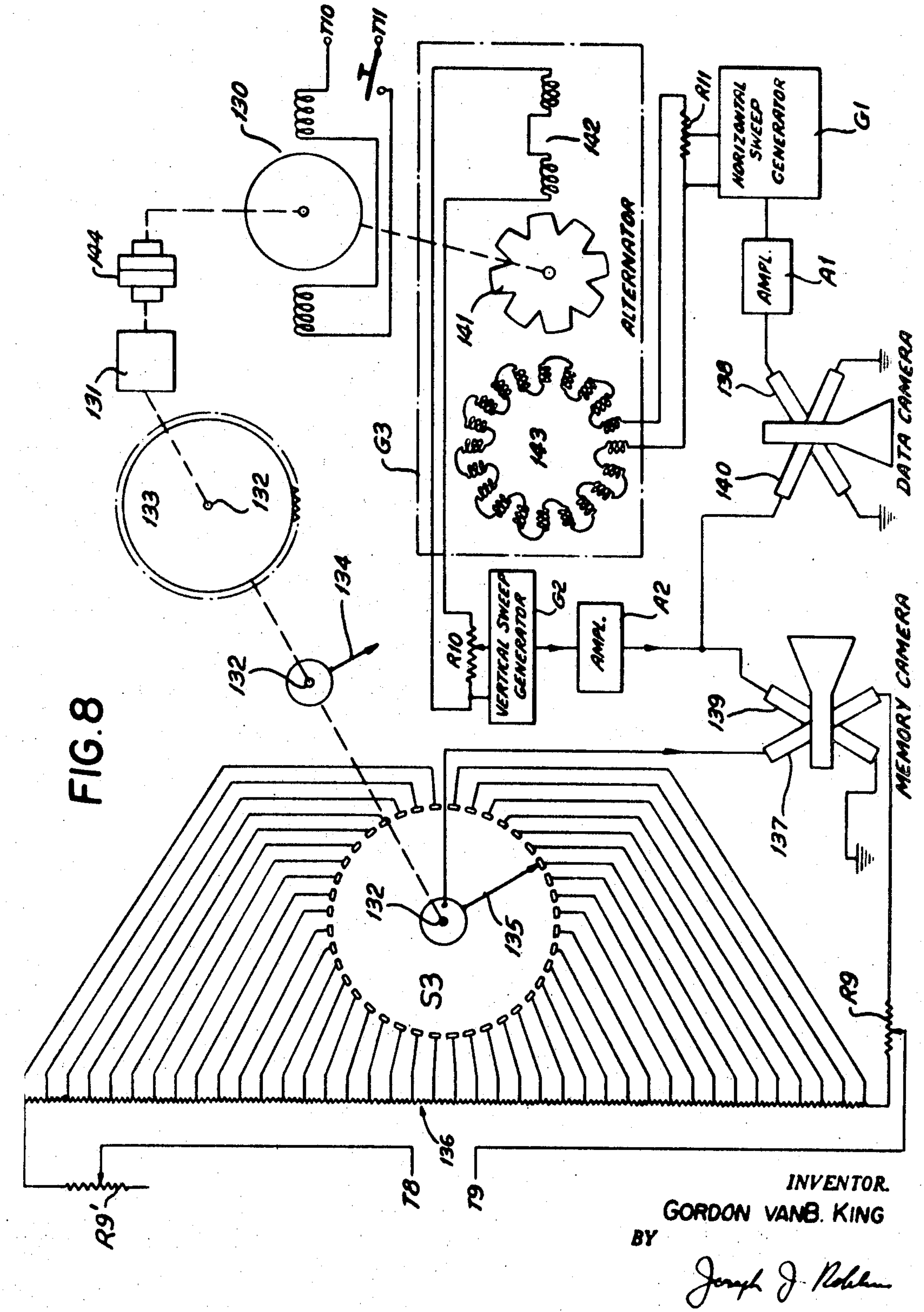
FIG. 8 is a schematic of the means for supplying deflecting voltages to the video cameras and of means for effecting other control functions in timed relation to the deflection cycles.

Referring now to FIG. 8, a two-pole synchronous motor 130 drives a reduction gear 131 which rotates a shaft 132. Fixed to this shaft are a drum cam 133, the brush 134 of a rotary switch or distributor S2 (also see FIG. 9), and the brush 135 of a distributor S3. The distributor S3 controls the horizontal deflecting voltage for the memory camera tube. Distributor S3 has 40 stationary contacts each of which connects to a different point of a voltage divider 136. The brush 135 connects through a slip ring to the horizontal deflection means 137 of the memory camera. This deflection means may be of the deflecting plate or magnetic coil type. As the brush 135 travels across each distributor contact in turn, the deflection means 137 will receive a constant voltage which will change suddenly to a different value as the brush leaves one contact and reaches the next. Thus, the distributor S3 will control the deflection means 137 of the memory camera to cause the electron beam in the memory camera to shift horizontally in 40 discrete steps and then return to repeat the sequence.

The voltage divider 136 is supplied with direct current from terminals T8 and T9. The supply voltage should be slightly higher than that needed to obtain full deflection in the memory camera. Potentiometers R9 and R9′ serve for adjusting the voltage on the divider 136 so that the over-all width of sweep will be consistent with the width of the memory mask in use; and so that the sweep may be centered on the mosiac of the camera tube, centered with the mask.

The horizontal sweep generator for the data camera DC is represented by G1 and is of known type such as a suitable relaxation oscillator circuit. The output of G1 is applied through an amplifier A1 to the horizontal deflection unit 138 of the data camera. A conventional vertical sweep generator G2 serves through an amplifier A2 to operate the vertical deflection unit 139 of the memory camera and the vertical deflection unit 140 of the data camera since, for reasons explained in the preceding section, the vertical sweeps in both cameras must be concurrent and proportional.

The sweep generators G1 and G2 are designed and adjusted, as usual, for slightly lower free running rates than the desired sweep frequencies which they are required to furnish. These generators will be forced to the desired frequencies by synchronizing signals from an alternator G3. This alternator has a rotor 141 directly coupled to the drive motor 130. The rotor is provided with permanent magnets on its periphery so as to form eight magnetic poles. Surrounding the rotor are two separate stator windings 142 and 143. The winding 142 has two poles and generates 4 waves per revolution of the rotor 141. These waves are applied as synchronizing signals to the vertical sweep generator G2 by way of an amplitude adjusting potentiometer R10. The other winding, 143, has twenty poles and generates 40 waves per revolution of the rotor which are applied as synchronizing signals, through the amplitude adjusting potentiometer R11, to the horizontal sweep generator G1.

Speeds.—Since the alternator, G3, the cam 133 and the distributor brushes 134 and 135 all are driven by the motor 130, they function in synchronism at speeds determined by the motor speed. The motor speed is chosen according to the desired rate at which the variable data symbols are to be processed. Assume that the machine is to identify, say, 12 symbols a second, average speed. According to the invention, the symbols are identified by comparison with the index pattern columns of the memory mask and the memory mask must be searched to find the index pattern column which corresponds to the symbol being scanned. Therefore, the speed at which the symbols are identified is not constant; correspondence between a symbol and an index pattern may be found on the first trial, or not until the fortieth. With forty columns on the mask, an average of twenty trials must be made to find correspondence.

To read 12 symbols a second, average, thus requires 240 trials per second; this means 240 symbol frames and 240 column scans per second. In the illustrative embodiment, each symbol frame has ten horizontal scan lines (trace and retrace per line), as indicated in FIG. 6; hence, the horizontal scanning speed of the data camera must be 2400 lines per second. Therefore, the sweep generator G1 must function at that frequency in response to synchronizing signals from the winding 143 of the alternator G3. Since winding 143 produces 40 signals per revolution of the rotor 141, in order for the winding to produce the required 2400 signals per second, the rotor must be driven at 60 r.p.s. The symbol frame frequency, in the assumed case, is 240 per second. Hence, the alternator winding 142 must apply synchronizing signals at that frequency to the scanning generator G2. Since winding 142 produces four signals per revolution of the rotor, it will provide the required 240 signals per second with the rotor operating at 60 r.p.s.

The rate at which scanning of the memory mask proceeds from column to column is controlled by the distributor S3. As understood from the previous description, one complete scan of the mask is effected during a single revolution of brush 135 in which it steps successively to the 40 stationary contacts of the distributor. In the assumed case, 240 column scans or trials are to be made per second, the same as the symbol frame frequency. This means 6 complete scans of the memory mask per second. Hence, the brush 135 of S3 must be driven at a speed of 6 r.p.s.

The brush 134 of the distributor S2 (see FIGS. 8 and 9) will also wipe 40 stationary contacts during one revolution, each contact representing one trial of the memory mask along a pattern column, for reasons which will appear from the subsequent description of the comparing circuit. Since 240 trials per second are required, the brush 134 of S2 must also be driven at 6 r.p.s. The cam wheel 133 has 40 cam teeth, one for each trial, and also is to be operated at 6 r.p.s.

In the assumed example, the rotor 141 of alternator G3 is to turn at 60 r.p.s. For driving the rotor at this speed, it is convenient to couple it directly to motor 130 and to operate the motor at 60 r.p.s. The motor has two poles and when supplied with 60 cycle power at terminals T10 and T11 runs at the required speed of 60 r.p.s. Reduction gearing 131 transmits drive from the motor to the common shaft 132 of cam 133 and distributor brushes 134 and 135 at the required speed of 6 r.p.s. An adjustable coupling 144 in the shafting between the motor and the gearing 131 makes it possible to set the elements 133, 134 and 135 for proper time relationship with the voltages generated by alternator G3. Different speeds of data processing than that chosen may be obtained by driving the motor 130 at other speeds than 60 r.p.s. Since the motor synchronously actuates the elements G3, 133, 134 and 135, the speeds of which determine the data processing speed, changing the speed of the motor does not affect the synchronization of these elements.

OPERATING CIRCUIT

Figure 9:
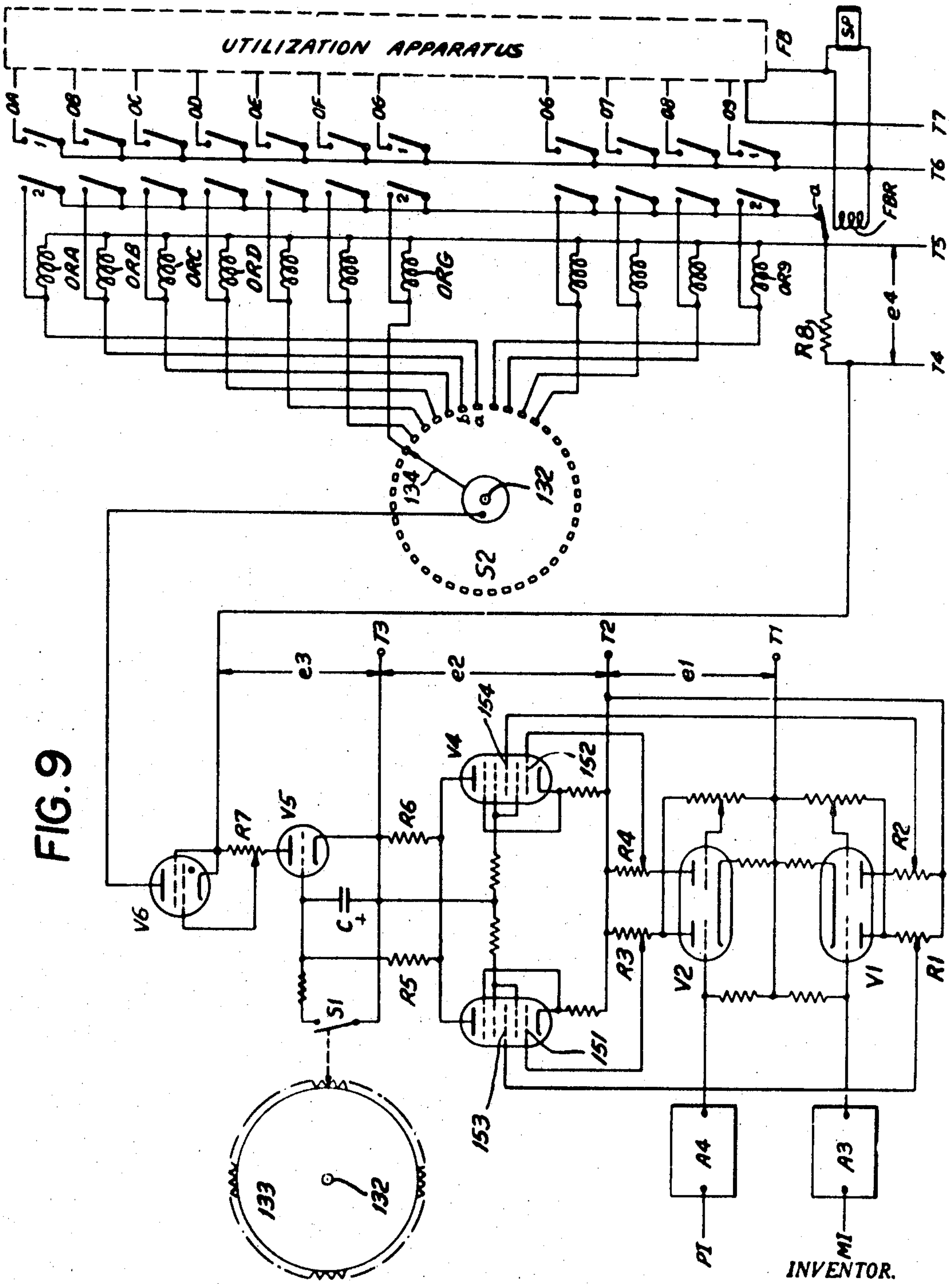
FIG. 9 is a similar view of the circuit for receiving and comparing the signals from the video cameras and for furnishing the desired output signals.

FIG. 9 is a simplified schematic diagram of the circuits used to receive the outputs of the data camera and the memory camera, to compare these outputs, and to produce the output signals of the processing system.

MI and PI represent the connections for the signal inputs from the memory camera and the data camera, respectively. Terminals T1 through T5 are connected to a suitable source of D.C. power which supplies the voltages *e*1, *e*2, *e*3 and *e*4. Terminals T6 and T7 connect to a suitable source of output power, direct or alternating as required by the external work device or utilization apparatus. Between the utilization apparatus and the distributor S2 is the data registering, entry control unit for the apparatus. FIG. 9 also shows a feedback connection FB from the utilization apparatus to the processing system on which a back signal will be produced to notify the system that the apparatus is ready for a next entry. Such back signals are commonly produced in the calculation art, the data communication art and in other arts.

Comparison circuit.—The comparison circuit appears in FIG. 9 at the left of distributor S2. This circuit will receive signal inputs from the data and memory cameras during each symbol frame. When either camera is on a dark area, its signal input to the comparison circuit is a "dark" signal of little or no effective voltage. But when either camera is on a light area, the corresponding signal input to the comparison circuit is a "light" signal of relatively large, positive voltage. If the symbol and the pattern column under scan during a symbol frame correspond, the resulting "dark" and "light" input signals to the comparison circuit are in coincident time sequences, but if the symbol and pattern are not corresponding, the "dark" and "light" signals received from the two cameras will be out of phase. A working maximum signal coincidence thus occurs when the symbol and pattern column simultaneously scanned correspond and fails to occur if the symbol and pattern do not correspond during a symbol frame.

The comparison circuit functions selectively according to the phase relation between the signals from the two cameras during a symbol frame or scanning cycle and produces an output manifestation upon detecting an in-phase relation during the cycle. In general, the comparison circuit includes means to receive the signals from the two cameras, gating or coincidence elements operating selectively to detect coincidence or in-phase relation of signals, from the two sources at each moment within the symbol frame, an integrating means to accumulate signal coincidence increments throughout the symbol frame, and and output means to produce a comparison output manifestation when the accumulation by the integrating means is a working maximum.

In detail, the comparison circuit includes two twin triodes V1 and V2. The left halves of V1 and V2 respectively receive signals emanating from the memory and data cameras. The signals from the memory camera are applied, as shown, to the grid of the left half of V1 by way of an input line M1 and an amplifier A3. The signals from the data camera are also shown as going through an input line P1 and an amplifier A4 to the grid of the left half of V2. The two amplifiers are preferably used in order to insure sufficient voltages to control V1 and V2. These amplifiers are of conventional design. The power supplies connected to terminals T1 to T7 are conventional in design and need not be shown. The cathode heaters and their circuits are not shown and are understood to be conventional. It is also evident that V1 and V2 may be replaced by four triodes in individual envelopes.

As understood, amplifiers A3 and A4 or either one may be omitted when the respective reading units for the data and the reference patterns, or either of these units, directly provide ample signal strength. In any event, a "dark" signal input to V1 or V2 is a low voltage input, while a "light" signal input is of relatively high, positive voltage. The left halves of V1 and V2 are biased to remain at or near cut off when acted on by "dark" signals and to become effectively conductive in response to "light" signals. The right halves of V1 and V2 have their grids tied to the anodes of the left halves, respectively, so that the two halves of each twin triode will assume opposite current conditions.

Potentiometers R1, R2, R3 and R4 are the load resistors for V1 and V2. The slider of R1 connects to the grid 153 of a multi-grid gate tube V3 and is adjusted so that with the left half of V1 off (at or near cut off), the grid 153 is substantially at cathode potential, but when the left half of V1 is on (effectively conducting), then the grid 153 is at or lower than cut off potential. A similar relation exists between the load resistor R3 of the left half of V2 and the grid 151 of the tube V3. The anode voltage and other parameters of V3 are set so that only when both grids 151 and 153 are concurrently at or near cathode potential, or above cut off potential, is the tube conducting. If either of the grids 151 and 153 is at cut off potential, V3 will not conduct. It follows that V3 conducts only at such times as the left halves of V1 and V2 are simultaneously off, as is the case only when they are receiving "dark" signals coincidentally. A similar relationship exists between a gate tube V4 and the right halves of V1 and V2, the grids 152 and 154 of V4 being respectively connected to the sliders of load resistors R4 and R2. Hence, V4 will be conducting only when the right halves of V1 and V2 are concurrently off, as is the case when the left halves are receiving "light" signals at the same time. Thus, one or the other of the tubes V3 and V4 will be conducting whenever there is a signal coincidence. If a signal coincidence is not taking place, then V1 and V2 will not be in like condition and both V3 and V4 will be non-conducting.

The signal coincidence effects manifested by conduction of either V3 or V4 are accumulated during a symbol frame by an integrating combination comprising a capacitor C and a high ohmic resistor R5 in series. The input side of C connects to voltage terminal T3 to which the upper end of the common load resistor R6 of V3 and V4 also connects. The resistor R5 terminates at the common anode line of V3 and V4. Thus, the resistor R5 and the capacitor C are in series circuit with each other and in parallel circuit with the output of V3 and V4. During any period when either V3 or V4 is conducting, anode current flows through R6. The resulting voltage drop across R6 causes a small current flow through R5 and C which charges C slowly. Since R5 has a high resistance, the charge on C is proportional to the length of time that a gate tube V3 or V4 is conducting. This charge is therefore proportional to the length of signal coincidence; i.e., the length of time that the signal inputs to V1 and V2 from the memory and data reading devices are both "light" or both "dark," during a symbol frame.

Maximum signal coincidence occurs when the pattern column under scan corresponds to the symbol at data reading position. Under such condition, the gate circuit comprising tubes V3 and V4 is open during all, or substantially all, of the symbol frame; hence capacitor C will receive maximum charge. If the pattern column and symbol are non-corresponding, both V3 and V4 will be simultaneously closed for a substantial proportion of the symbol frame and the capacitor will receive a proportionately smaller charge.

A tube V5 serves to amplify the voltage across the capacitor C and to reverse its polarity so as to control firing of a thyratron V6. Tube V5 is normally conducting by reason of the connection between its grid and cathode via R5 and R6 (or via a switch S1 when closed). As the capacitor C becomes charged, however, it drives the grid of V5 negative, reducing the voltage drop across its load resistor R7. The resistor R7 is a potentiometer the slider of which connects to the control grid of V6. When the capacitor has been charged to the extent indicative of correspondence between the scanned symbol and pattern column, it so reduces current flow through V5 that the voltage at the tapped point of R7 is sufficient to fire V6.

The slider of R7 is adjusted so that V6 will fire near the end of any symbol frame in which a mask column corresponding to the symbol is scanned. Conversely, the adjustment is such that V6 will not fire during a symbol frame in which the symbol is scanned simultaneously with any non-corresponding column of the mask.

At the end of each symbol frame, the switch S1 is closed momentarily by a cam tooth of the cam wheel 133. This discharges the capacitor C, leaving it ready to receive new charges during the next symbol frame.

Exact signal coincidence during a symbol frame would result in the highest possible charge on the capacitor C since the gate circuit, comprising V3 and V4, would be open throughout the entire frame time. Critically exact signal coincidence is difficult to obtain in practice and is not required for proper functioning of the system. The differences among the data symbols are great enough or can be made so to compensate for chance variations in the printing or typing of the symbols on a data sheet and other chance variations. In any event, the potentiometer R7 serves as a tolerance control. The slider of R7 can be adjusted according to the degree of exactness desired between a symbol and its corresponding index pattern. The adjustment is such that the charge on the capacitor C which causes the thyratron V6 to fire may vary from the optimum by a reasonable tolerance, care being taken to limit the tolerance to that which permits the thyratron to fire only at the end of a symbol frame in which the pattern column scanned is the one corresponding to the symbol being scanned and so that the thyratron will not fire during a symbol frame in which any pattern column not corresponding to the symbol is scanned.

The output circuit.—The output circuit of the system produces a distinctive manifestation of the symbol at reading position when the comparison circuit finds the mask column corresponding to this symbol. Included in the output circuit are the distributor S2 (FIG. 9) and the data registering unit provided with the outlets OA to O9. In the specific embodiment being considered, there are forty outlets, one for each symbol, and forty output relays, ORA to OR9, for respectively rendering the outlets effective. To simplify the drawing, FIG. 9 shows only a representative number of the relays and outlets. It is to be noted that the last character in the designation of each of the relays and outlets indicates the symbol to which each relates. The relays have a common connection with the voltage terminal T5 and individual connections with the forty fixed contacts of the distributor S2. The brush 134 connects to the plate of the thyratron V6, the end element of the comparison circuit. Thus, voltage from terminal T5 is applied to the plate of V6 through any one of the relays when the S2 contact connected to the relay is being engaged by the S2 brush 134. Cathode voltage for V6 is supplied from terminal T4 lower in voltage than T5 by the difference *e*4. The above arrangement permits only one relay at a time to be operated, the operated relay being the one connected through the distributor S2 to V6 at the time V6 is triggered.

As previously explained, the rotation of the distributor brush 134 is synchronized with the rotation of the brush 135 of distributor S3 (also see FIG. 8). The position of brush 135 determines which mask column the memory camera is scanning: hence, the rotation of the brush 134 of S2 is also synchronized with the scanning of the mask columns. For example, when the scanning beam of the memory camera is at about the midpoint of column "A" of the mask, the brush 134 reaches the contact *a* of S2. Tube V6 is then receiving anode voltage through the coil ORA and if V6 is triggered at the end of the scan of column "A," which is the case only if the symbol at reading position is A, then the relay is energized. Contacts 1 of the relay close and output power appears between terminal T6 and the terminal T7 which connects to the common return line of the entry receiving circuits of the utilization apparatus.

As scanning starts on the next mask column "B," the brush 134 reaches the end of the contact *a* of S2 and passes onto an insulating segment. This cuts off the anode voltage from V6, and the tube deionizes (if it has been ionized). As the midpoint of the "B" scan is reached, the brush 134 reaches the contact *b* of S2, and so forth.

By this construction, S2 directs the output of the thyratron V6 to the correct outlet for applying the symbol identified by the comparison circuit to the utilization apparatus.

The pick up circuit for a selected output relay is made through the thyratron V6 and this circuit opens as soon as the brush 134 leaves the contact of S2 connected with the relay. The relay is to remain energized, however, until a feedback signal from the utilization apparatus indicates that this apparatus has received the symbol-representing signal from the outlet controlled by the relay. For this purpose, each output relay, upon energization, closes stick contacts 2 to establish a holding circuit from T5, through the relay coil, its stick contacts, the normally closed points *a* of relay FBR, and via a current limiting resistor R8, to T4. When the utilization device has operated under control of the output signal, it sends a back signal, in the form of a momentary current flow, through the connection FB, the solenoid SP and parallel relay FBR, to terminal T6. Relay FBR opens its points *a* to break the stick circuit of the operated output relay. Energization of the solenoid SP by the return signal operates the intraline spacing means of the record handling device to advance the next symbol to reading position.

As an example, the data utilization device may be a typewriter with solenoid actuated type and space actions, the solenoids being energized in response to the output signals from the system. Such typewriter can be equipped with a switch closed by a common element of the space mechanism; for instance, the escapement pawl. Closure of the switch by the pawl can be used to establish the return signal circuit from the common voltage terminal T7 of the source of output power and through the solenoid SP and relay FBR of the system, to the terminal T6.

Construction of memory masks.—A memory mask can be prepared by analysis and measurement of the symbols and scan pattern indicated in FIG. 6. A preferable way to construct a mask would be by photography, using a cathode ray tube such as the tube 21 (FIG. 3) of a flying-spot camera as an exposure device for a piece of photographic film or paper and operating the brightness control of the tube under control of the data camera DC (FIG. 2). The output circuit of the camera would be disconnected from the comparison circuit, or the amplifier A4 (FIG. 9) would be disconnected, and be connected to the brightness control of the cathode ray tube. The piece of unexposed photographic film or paper would be marked out into 40 columns. All columns except the first would be taped over to protect them from light. With symbol A in front of the data camera and the photographic film or paper in position directly against the face of the cathode ray tube, the device would be run for a number of symbol frames until the first column of the film or photographic paper was sufficiently exposed. Then the first column would be taped over and the second uncovered. With letter B in front of the data camera, the second column would be exposed, and so on until the entire group of symbols had been transposed into the corresponding index patterns on the film or photographic paper. The resulting film, when developed, could be used as a negative from which a positive print could be made to serve as an accurate memory mask for the particular group of symbols and their type size and style. It is understood that different masks will be constructed and used for different groups of data symbols.

ALTERNATIVE MEANS TO GENERATE THE REFERENCE SIGNALS

The invention may make use of means alternative to the memory camera and the graphic index patterns for generating the reference signals. Such alternative means may be of the magnetic type or of the commutator and brush type, or the like. The magnetic means for generating the reference signals may include an endless magnetic tape or may include a magnetic drum such as the drum MD (FIG. 4) previously described. The drum MD is mounted on the shaft 132 to rotate in unison with the cam wheel 133 and the brush 134 of distributor S2 (see FIGS. 8 and 9). During rotation of the drum, the conventional magnetic head MH will scan the sequential magnetic index patterns and, through the amplifier A5, will produce reference signals applied to the signal input MI in place of the signals from the memory camera. The index patterns will be so arranged and sized on the drum periphery that each reference pattern will be scanned during a symbol frame and the scanning of the different reference patterns will be coordinated with the corresponding steps of the brush 134 of S2, i.e., the pattern relating to symbol A will be scanned during the *a* step of the brush 134, the pattern for symbol B will be scanned during the *b* step of the brush 134, and so on.

The magnetic record patterns may be initially recorded on the drum by connecting the output of the data camera through a suitable amplifier—A5 may be used—to the magnetic head MH. A switch (not shown) would be temporarily attached to the shaft 132 and so constructed that it would short-circuit, or blank out, the output of the amplifier to the magnetic head during $^{39}\!/_{40}$ of a revolution of the shaft, and permit the amplifier to drive the magnetic head during just $^{1}\!/_{40}$ of the revolution. To form the index pattern for symbol A, this symbol will be brought to the reading position in front of the data camera and the drive means for shaft 132 and the scanning generators for the data camera will be operated in normal fashion. The output of the data camera will then be effective through an amplifier to activate the magnetic head MH for magnetically impressing within an arc covering $^{1}\!/_{40}$ of the drum periphery the magnetic index pattern corresponding to the symbol A. The magnetic drum will be rotated through a number of revolutions to insure that the magnetic index pattern for symbol A has been impressed with the desired intensity. The motor 130 (FIG. 8) will then be stopped. The temporary switch will then be adjusted to its next position so that the magnetic head will be conditioned for action upon the $^{1}\!/_{40}$ arc of the magnetic drum adjacent to the arc on which the A index pattern has been recorded. With symbol B at the reading position in front of the data camera, the motor 130 will be restarted and the time sequence of signals corresponding to symbol B will then be magnetically recorded on the magnetic drum in the arc adjacent the arc bearing the magnetic index pattern for symbol A. This procedure will be followed in magnetically recording all 40 index patterns on the drum.

Once such a magnetic drum has been processed, the series of magnetic patterns on its periphery may be duplicated on other drums by well-known methods. Thus, the procedure for magnetically recording the index patterns would be necessary only in making the first drum for any particular data type face.

In recording the index patterns on the drum, positional synchronism between the index pattern arcs and the corresponding steps of the brush 134 of distributor S2 may be maintained, or such positional synchronism may be obtained subsequently by adjustment of the drum about the shaft 132.

A magnetic tape may be processed with index patterns similarly to the magnetic drum, except that the tape will be driven by capstan means in synchronism with shaft 132.

Reference signals may alternatively be supplied to the comparing unit by commutator means operated by shaft 132. The commutator may be provided with conductive spots corresponding in size and placement with, say, the "light" signals produced by the data camera while scanning the data symbols.

Another alternative generating means for reference signals may employ a grooved drum or disk similar to the record used in a conventional phonograph, except that the record would have an endless groove mechanically simulating the successive index patterns. Such record would be driven by shaft 132 and the index patterns would be read out by a phonograph needle and pick-up which, through a suitable amplifier, would supply the reference signals to the memory input of the comparison circuit. To produce the initial record for any particular type face, a cutting stylus mounted in a recording head would be used to cut the groove, following the general procedure used in forming the magnetic index patterns on the magnetic drum. Once made, this master record could be duplicated by conventional methods.

The data processing system disclosed herein can be applied to the processing of a greater or lesser number of different data elements than the 40 specifically discussed. The memory mask or other memory member is required to have only a number of index patterns, in any one array, equal to the number of different data elements.

It is to be understood that various changes, substitutions and omissions in the form and details of the device shown and described and in its operation may be made by those skilled in the art without departing from the spirit of the invention. It is intended, therefore, to be limited only according to the following claims.

What is claimed is:

1. A data processing system for various individual conventional legible data symbols on a record, comprising a record handling device to feed the record so as to present the symbols one after another at a reading position, a video camera for effecting repeat scannings of the symbol at reading position during successive symbol frames with a cathode ray beam deflected in coordinate directions through a scanning raster in each symbol frame and producing in each frame an electrical signal of the scanned symbol, means for synchronously producing a sequence of electrical reference signals, each during a symbol frame and each relating to a different data symbol, a circuit network for comparing the symbol signal with the reference signals one after another at sequential times of a readout cycle and including a receiving circuit for the symbol signal, a receiving circuit for the sequential reference signals, circuit means under joint control of said receiving circuits for producing an output signal only once during the readout cycle and only upon concurrence during a symbol frame of the reference signal relating to the scanned symbol and the signal resulting from scanning of this symbol, and entry receiving means for selectively receiving different data entries corresponding to different symbols and effective under control of the single output signal per readout cycle for receiving a single data entry per cycle, said entry being selected according to the timing of the output signal within the readout cycle.

2. A data processing system for various individual conventional legible data symbols on a record, comprising a video camera for scanning one symbol at a time with a cathode ray beam deflected in coordinate directions and producing an electrical symbol counterpart signal, means bearing a plurality of reference patterns corresponding to different data symbols, means for sequentially translating the reference patterns into respective electrical reference counterpart signals, a circuit network for comparing the symbol signal with one after another of the reference signals to find the reference signal corresponding to the data symbol being scanned and selective symbol utilization apparatus thereupon operated under control of the comparing circuit network for utilizing the scanned symbol and initiating scanning of the next symbol on the record.

3. A data processing system for various individual conventional legible data symbols successively presented at a reading position, comprising a video camera for iteratively scanning a data symbol at the reading position with a cathode ray beam deflected in coordinate directions, making one complete scan in each of successive symbol frames and producing in each frame a time sequence combination of signal currents representative of the scanned symbol, means bearing a plurality of index patterns respectively relating to different data symbols, means responsive to the index patterns one after another, each in a symbol frame time of an automatically recurrent identifying cycle for the symbols to translate each pattern into a time sequence combination of signal currents representative of the pattern, the combination of signal currents produced upon translation of each pattern and that produced by the camera upon scanning of the related data symbol having a unique phase relation, and a comparison unit for comparing the combination produced by scanning of the symbol at the reading position with the combinations of signal currents produced by the translation of one index pattern after another and producing an output signal only upon detecting the unique phase relation between the combination representative of the symbol at the reading position and the combination representative of the index pattern relating to the latter symbol at the differential time of the cycle indicative of the symbol.

4. A data processing system for various conventional graphic data symbols presented one at a time at a reading position, comprising a first video camera for iteratively scanning a data symbol at reading position, one scan during each of successive symbol frames, and producing in each frame a time sequence of signal currents constituting the picture signal of the scanned symbol, a member bearing an array of graphic index patterns respectively relating to different data symbols, a second video camera for scanning the index patterns sequentially during a recurrent identifying cycle, each in a symbol frame, and producing in each frame a time sequence of signal currents constituting the picture signal of the index pattern being scanned, each pattern picture signal having a unique phase relation only with the picture signal of the related data symbol, and a comparison unit for comparing the picture signal of the symbol at reading position with the sequentially produced pattern signals to produce an output manifestation only upon detecting said unique phase relation.

5. The data processing system as in claim 4, deflection control means for the scanning beams of the first and second video cameras including a common scanning generator for controlling the symbol framing sweep of the scanning beam of the first camera and coordinately controlling the index pattern scanning sweep of the scanning beam of the second camera, said deflection control means further including a scanning generator for controlling movement of the scanning beam of the first camera through a given number of scan lines across the symbol framing direction, and said deflection control means still further including a scanning generator for producing incremental shifting between symbol frames of the scanning beam of the second camera from one index pattern to the next.

6. The data processing system according to claim 4, in which said unique phase relation is an in-phase relation between the signal currents in the picture signal of an index pattern and the signal currents in the picture signal of the related data symbol, said comparison unit including respective inputs for the picture signal of the symbol at reading position and for the sequentially produced pattern picture signals, an electronic gate circuit operated under control of said inputs during in-phase periods of the signal currents respectively being applied to said input, an integrating circuit associated with said gate circuit for cumulatively manifesting in-phase time of the signal currents throughout a symbol frame, and an output circuit rendered effective by the integrating circuit upon manifesting a cumulative in-phase total time indicative of said unique phase relation during the symbol frame.

7. A data processing system comprising means for producing a time-sequence pattern of pulses constituting a composite electrical signal representative of a data item, means for concurrently producing a time-sequence pattern of comparable pulses constituting a composite electrical signal representative of an item of reference data, and means for comparing the two patterns pulse by pulse including a pair of circuits respectively receiving the pulse patterns, a coincidence circuit selectively effective under control of the pair of receiving circuits according to correspondence of the concurrently produced pulses of the two patterns, an integrating circuit including a capacitor incrementally varied in charge under control of the coincidence circuit upon each pulse-correspondence, and an output circuit rendered effective only by a capacitor charge indicative of substantial overall correspondence of the compared pulse patterns, the output circuit comprising a trigger circuit, and means including an adjustable resistive connection between the integrating circuit and the trigger circuit for applying operating potential to the trigger circuit upon the capacitor charge reaching a required effective value indicative of correspondence of the two pulse patterns within a working tolerance, said resistive connection being adjustable to vary the required effective charge value according to the desired tolerance.

8. A system for automatically processing variable data composed of different legible characters on a record member, comprising means for feeding the record member to bring one character after another to a reading position, cyclical electrical scanning and signal producing means for repetitively completely scanning the same character at said reading position during a number of scanning cycles and producing in each of these scanning cycles a time-sequence of pulses constituting a code signal representative of the scanned character, a record medium bearing different code patterns arranged in predetermined order and respectively relating to different characters, each code pattern being a recorded wave form of the time-sequence of pulses in the code signal of the related character, means for sensing the different code patterns sequentially at successive scanning cycle times of a readout cycle to produce time-sequences of pulses constituting reference signals respectively matching the different character code signals, a circuit network for effecting pulse-by-pulse comparison between the code signal of the character being scanned and one after another of the reference signals to detect the one matching reference signal during the readout cycle, and variable data utilization apparatus thereupon operated by the comparing circuit network according to the scanning cycle time of the readout cycle during which the matching reference signal is detected to effect manifestation of the scanned character and to render the feeding means effective to advance the record member so as to bring the next character to the reading position.

9. A system for processing variable data composed of different discrete conventional legible characters on a record member, comprising a video camera for repeatedly scanning one character at a time with a cathode ray beam deflected in coordinated directions through a scanning raster in each of successive scanning cycles and generating in each scanning cycle a time-sequence of pulses constituting a code signal of the scanned character, a record medium bearing different character code patterns arranged in predetermined order, each code pattern being a recorded wave form of the time-sequence of pulses in a different one of the character code signals, means for sensing the code patterns at successive scanning cycle times of a readout cycle to generate time-sequences of pulses constituting reference signals respectively matching the different character code signals, a circuit network for effecting pulse-by-pulse comparison between the code signal of the character being scanned with one after another of the reference signals and including a receiving circuit for the character code signal, a receiving circuit for the sequential reference signals, and means under joint control of the receiving circuits for producing a single output signal during the readout cycle, said output signal being produced only upon concurrence during a scanning cycle time of the readout cycle of the matching character code signal and the corresponding reference signal, and entry receiving means for selectively receiving data entries corresponding to different characters and effective under control of the single output signal during the readout cycle for receiving a single data entry during the readout cycle, said entry being selected according to the timing of the output signal within the readout cycle.

10. A system for processing variable data composed of different discrete conventional legible characters on a record member, comprising means for analyzing the characters one at a time and producing time-sequence pulse combinations varying according to the configurations of the different characters, each different pulse combination being representative of a different one of the characters, means including a magnetic record medium and coacting pick-up for producing in continuously repetitive readout cycles a series of reference time-sequence pulse combinations respectively matching the different character representative pulse combinations, means for effecting pulse-by-pulse comparison between the pulse combination representative of the character being analyzed and one after another of the reference pulse combinations at sequential times of a readout cycle to detect the one matching reference combination, and selective character manifesting means operating under control of the comparison means upon detection of the matching reference combination for effecting a character manifestation depending upon the sequential time of the readout cycle at which the matching reference combination is detected by the comparison means.

11. A system for processing variable data composed of different discrete conventional legible characters graphically recorded on a record member, comprising a video camera for scanning one character at a time with a cathode ray beam deflected in coordinate directions through a scanning raster in each of successive scanning cycles and generating a time-sequence combination of pulses representative of the scanned character, a magnetic record medium bearing magnetic patterns of the different character respresentative pulse combinations, coacting magnetic pick-up means for generating from the magnetic patterns, at sequential scanning cycle times of a readout cycle, a series of reference time-sequence pulse combinations respectively matching the different character representative pulse combinations, means for effecting pulse-by-pulse comparison between the pulse combination representative of the character being scanned and one after another of the series of reference pulse combinations to detect the one matching reference pulse combination at a differential time of the readout cycle, and selective character utilization apparatus operating under control of the comparison upon detection of the matching reference combination for utilizing the scanned character and initiating scanning of a next character on the record.

12. A system comprising means for producing a time-sequence pattern of pulses constituting a composite electrical signal representative of an item of data, means for concurrently producing a time-sequence pattern of comparable pulses constituting a composite electrical signal representative of an item of reference data, and means for comparing the two patterns pulse by pulse including a pair of circuits respectively receiving the pulse patterns, a coincidence circuit selectively effective under control of the pair of receiving circuits according to correspondence of the concurrently produced pulses of the two pulse patterns, an integrating circuit including a capacitor incrementally varied in charge under control of the coincidence circuit upon each pulse-correspondence, and an output circuit rendered effective only by a capacitor charge indicative of substantial correspondence of one pattern of pulses with the other pattern of pulses, each of the two compared time-sequence patterns of pulses consisting of relatively positive and negative pulses, said coincidence circuit including one means for matching positive pulses in the compared patterns and another means for matching negative pulses in the compared patterns, and said integrating circuit being coupled to both pulse matching means to enable the capacitor to integrate a total charge indicative of matching intervals of the positive and negative pulses in the compared pulse patterns.

References Cited

UNITED STATES PATENTS

| | | | |
|---|---|---|---|
| 1,838,389 | 12/1931 | Goldberg. | |
| 1,915,993 | 6/1933 | Handel | 340—149 |
| 2,026,330 | 12/1935 | Tauschek. | |
| 2,115,563 | 4/1938 | Tauschek. | |
| 2,124,906 | 7/1938 | Bryce. | |
| 2,131,911 | 10/1938 | Ayres. | |
| 2,228,782 | 1/1941 | Sharples. | |
| 2,254,932 | 9/1941 | Bryce. | |
| 2,533,242 | 12/1950 | Gridley | 340—318 |
| 2,571,164 | 10/1951 | Rine. | |
| 2,586,963 | 2/1952 | Knutsen | 178—15 |
| 2,590,110 | 3/1952 | Lippl | 340—345 |
| 2,594,731 | 4/1952 | Connolly | 340—318 |
| 2,648,723 | 8/1953 | Goldsmith. | |
| 2,657,377 | 10/1953 | Gray | 340—345 |
| 2,663,758 | 12/1953 | Shepard. | |
| 2,679,636 | 5/1954 | Hillyer | 340—149 |
| 2,712,898 | 7/1955 | Knutsen. | |
| 2,731,621 | 1/1956 | Sontheimer | 340—149 |
| 2,762,862 | 9/1956 | Bliss. | |
| 2,594,358 | 4/1952 | Shaw | 340—149 X |
| 2,616,983 | 11/1952 | Zworykin | 340—174.1 |
| 2,897,481 | 7/1959 | Shepard | 340—149.1 |

MAYNARD R. WILBUR, Primary Examiner

U.S. Cl. X.R.

178—6.8; 340—146.2